United States Patent
Ahn

(10) Patent No.: US 6,233,695 B1
(45) Date of Patent: May 15, 2001

(54) DATA TRANSMISSION CONTROL SYSTEM IN SET TOP BOX

(75) Inventor: Do Keun Ahn, Anyang-Si (KR)

(73) Assignee: LG Information & Communications, Ltd., Seoul (KR)

( * ) Notice: Subject to any disclaimer, the term of this patent is extended or adjusted under 35 U.S.C. 154(b) by 0 days.

(21) Appl. No.: 09/218,116

(22) Filed: Dec. 21, 1998

(30) Foreign Application Priority Data

Dec. 31, 1997 (KR) .................................................. 97-82165

(51) Int. Cl.⁷ ...................................................... G06F 19/00
(52) U.S. Cl. .............................................................. 713/400
(58) Field of Search .................................... 713/400, 401; 370/542–544; 348/500, 510, 512; 375/354

(56) References Cited

U.S. PATENT DOCUMENTS

| | | |
|---|---|---|
| 5,396,497 | 3/1995 | Veltman . |
| 5,430,485 * | 7/1995 | Lankford et al. .................. 348/423.1 |
| 5,559,999 * | 9/1996 | Maturi et al. .......................... 713/400 |
| 5,959,684 * | 9/1999 | Tan et al. .............................. 348/515 |
| 5,960,006 * | 9/1999 | Maturi et al. ......................... 370/509 |
| 5,973,758 * | 10/1999 | Soroushian et al. .............. 348/845.2 |
| 6,002,687 * | 12/1999 | Magee et al. ......................... 370/394 |
| 6,041,161 * | 3/2000 | Okamoto et al. ..................... 386/112 |
| 6,115,422 * | 9/2000 | Anderson et al. .................... 375/240 |
| 6,148,135 * | 11/2000 | Suzuki ................................... 386/12 |

* cited by examiner

Primary Examiner—Thomas M. Heckler
(74) Attorney, Agent, or Firm—Long Aldridge & Norman, LLP

(57) ABSTRACT

The present invention provides data transmission control system in Set Top Box STB capable of matching output timings of a video or audio signal and a synchronous signal of the video or audio signal by controlling the transmission of the data bitstreams when transmission paths of video data or audio data and the synchronous signal of the video or audio data, are different from each other. Therefore, it is capable of solving the problems generated by asynchronization of a presentation signal.

The present invention provides the video data transmission control system in Set Top Box(STB), comprising a bitstream control means in a data transmission path for matching timings of the bitstream ES(Elementary Stream) and a Presentation Time Stamps(PTS), in which the PTS and data ES are selected from compressed data ES respectively, which are transmitted for dynamic image presentation, decoding the ESs according to the PTS, and applying the decoded ES to an output device on the data transmission path.

15 Claims, 5 Drawing Sheets

DATA TRANSMISSION CONTROL SYSTEM IN SET TOP BOX

BACKGROUND

1. Technical Field

The present invention relates to a data transmission control system and, particularly, to a data transmission control system in a set top box(hereinafter, referred to STB) for matching timings between transmission data and synchronous signal of the data exactly, in case that transmission paths of the transmission data and the synchronous signal in the STB are different.

2. Background

Generally, a data transmission control system in a conventional STB has a demultiplexer DEMUX 10 for receiving compressed video/audio bitstreams from a video server and demultiplexing the bitstreams, a microprocessor 20 for synchronizing a presentation signal with a system clock, and a video decoder 30 and an audio decoder 40 for encoding the video/audio bitstreams and providing the bitstreams to a video output device and an audio output device, shown in FIG. 1.

The DEMUX 10 demultiplexes the compressed video/audio bitstreams transmitted from the video server using MPEG-2(Moving Picture Experts Group-2) to a Presentation Time Stamps PTS and a video bitstream ES(Elementary Stream) and an audio bitstream ES. The audio ES is transmitted through a transmission path connected to the audio decoder 40. The video ES is transmitted through a transmission path connected to the video decoder 30. Here, the PTS is transmitted to the video decoder 30 via the microprocessor 20 in order to be synchronized with the video ES. Accordingly, transmission time of the PTS affects the synchronization of the video signal.

The video decoder 30 allocates the PTS on the basis of a sequence header inside of the video ES. Referring to FIG. 2 the video ES and the PTS are synchronized with PTS1 and ES1, PTS2 and ES2, and PTS3 and ES3, respectively when the video signal is normally synchronized. Thereby, the video decoder 30 may decode video data exactly.

Further information can be found in copending U.S. Pat. No. 5,559,999, entitled "MPEG decoding system including tag list for associating presentation time stamps with encoded data units", which is incorporated by reference herein.

However, the PTS may be not synchronized with the video ES in case that the PTS is applied to the video decoder 30 upon being delayed from the microprocessor 20, referring to FIG. 3. Here, the video decoder 30 recognizes that the first PTS 1 is a synchronization signal of the ES1 correctly. But, the ES 2 signal has already applied to the video decoder 30 when the PTS 2 signal is applied to the video decoder 30. Accordingly, the video decoder 30 misses the ES2 sequence header and recognizes that the PTS2 signal is the synchronization signal of the ES3, and the synchronization between the PTS signal and the ES signal is therefore asynchronized.

Consequently, there are problems that the presentation screen is distorted or trembled and also lip sink is not matched with audio when the PTS and the video ES are asynchronized.

SUMMARY

Accordingly, in order to solve the problems in the prior art it is an object of the present invention to provide a data transmission control system in Set Top Box STB capable of matching output timings of a video or an audio signal and a synchronous signal of the video or audio signal by controlling the transmission of the data bitstreams when transmission paths of video data or audio data and the synchronous signal of the video or audio data, are different from each other.

In order to achieve the above object, in accordance with an aspect of the present invention, there is provided a data transmission control system in STB, comprising a control unit in a data transmission path where PTS and data bitstream ES are selected from compressed data ES respectively, which are transmitted for dynamic image presentation, decoding the ESs according to the PTS, and applying the decoded ES to an output device on the data transmission path, the control unit for supervising the PTS transmission timing and the ES, and matching timings of the ES and the PTS with a supervising result.

Additionally, the data transmission control system in the STB further comprises a bitstream delay means of which output is automatically controlled by the control means on the data transmission path.

BRIEF DESCRIPTION

The above and other objects and features of the present invention may be fully understood from the following detailed description and the accompanying drawings in which.

Figure 1:
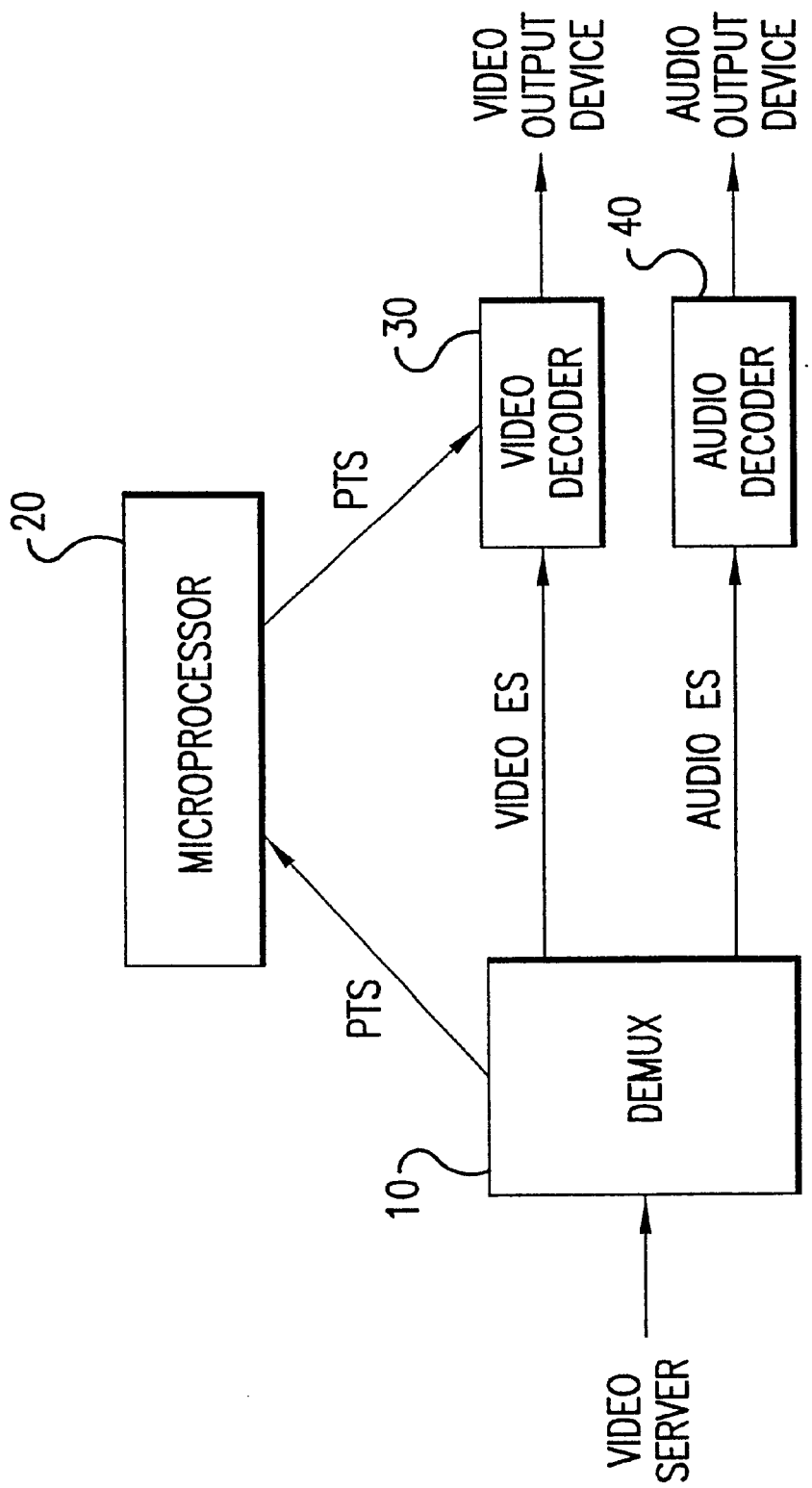
FIG. 1 shows a block diagram about the data transmission control system of the conventional STB.
Figure 2:
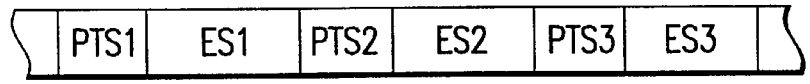
FIG. 2 shows a signal flowchart of a normal video bitstream ES and PTS in the data transmission control system of the conventional STB.
Figure 3:
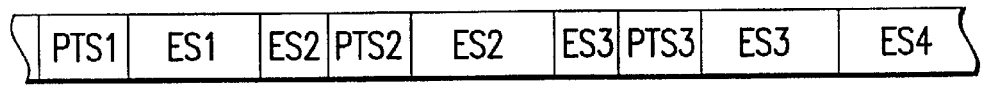
FIG. 3 shows a signal flowchart of the video bitstream ES and PTS in case that transmission delay is generated in the data transmission control system of the conventional STB.
Figure 4:
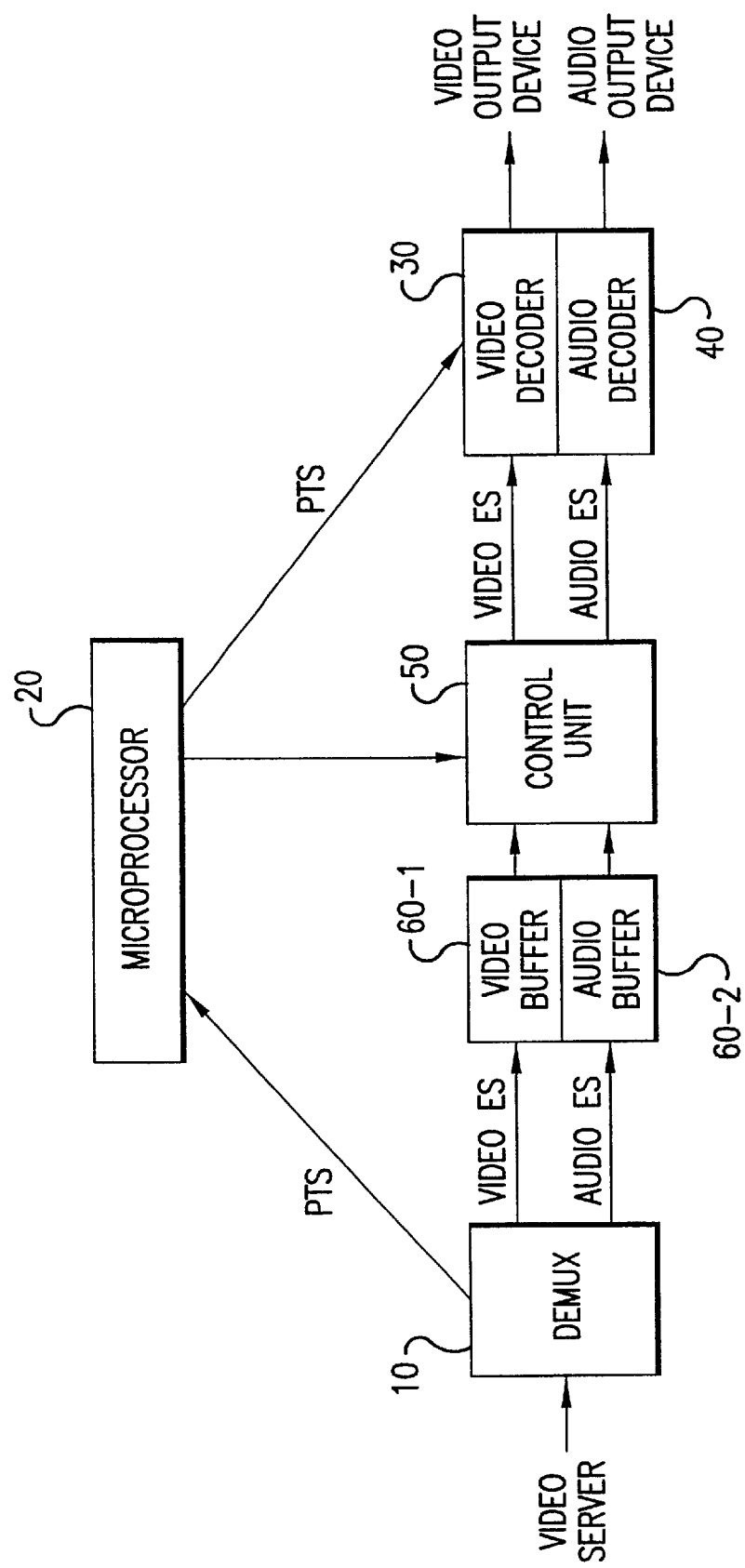
FIG. 4 shows a block diagram about the data transmission control system of the STB in accordance with an embodiment according to the present invention.
Figure 5A:
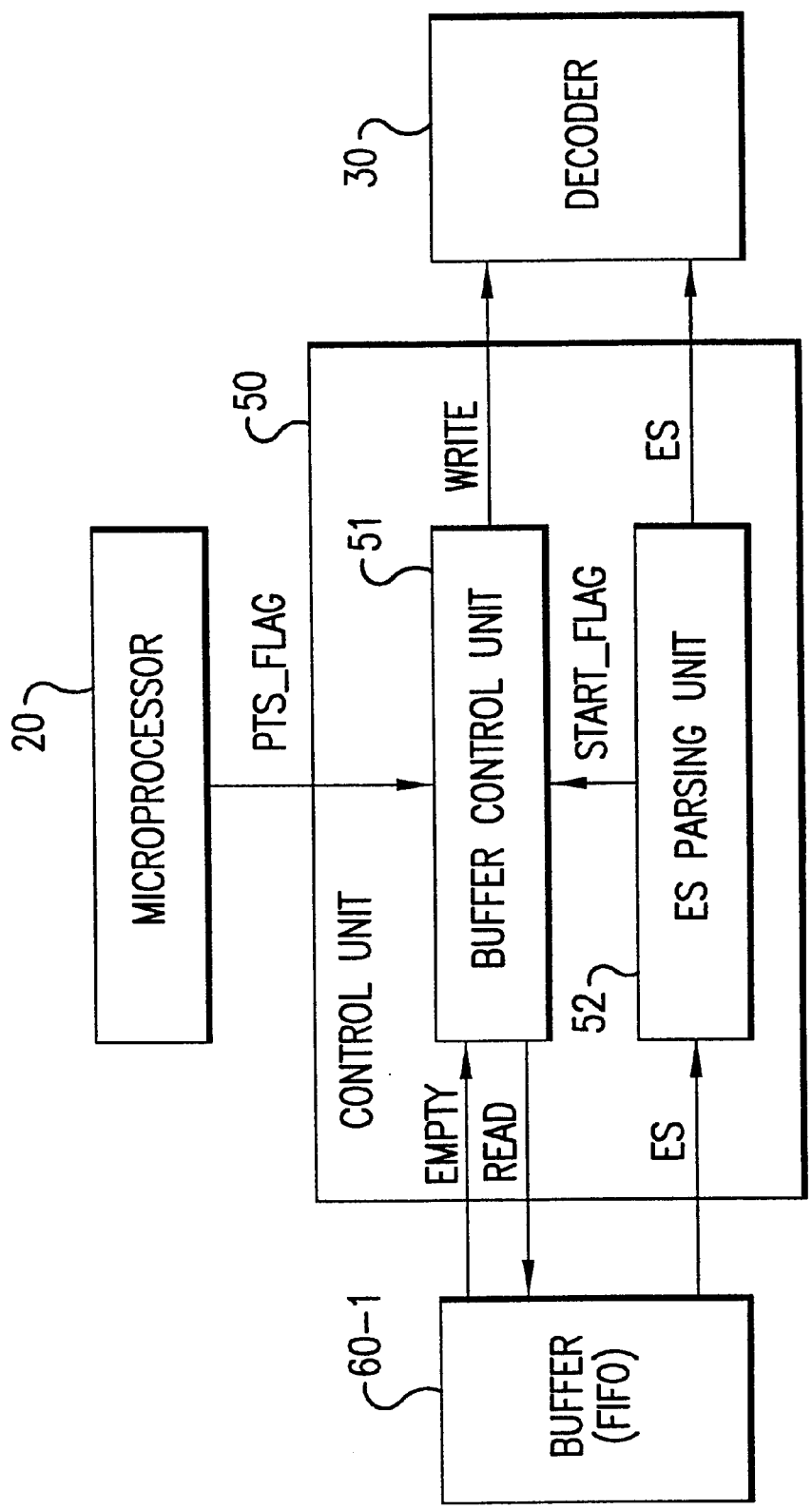

FIG. 5a indicates in detail a diagram of the control unit of the FIG. 4.

Figure 5B:
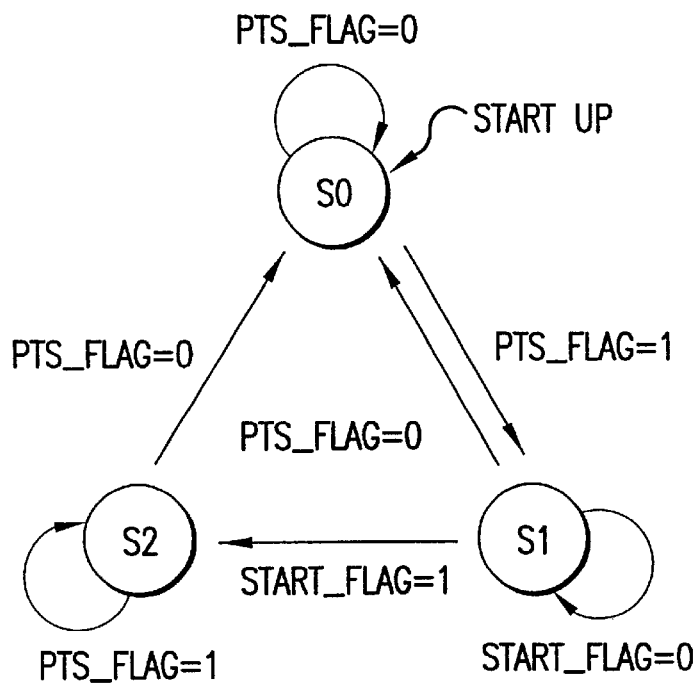

FIG. 5b indicates in detail an operational diagram of the control unit of the FIG. 4.

Figure 6:
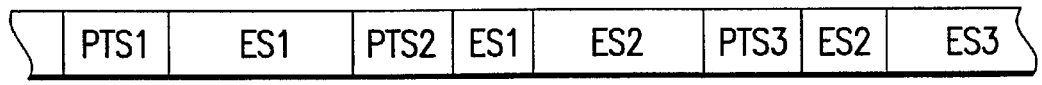

FIG. 6 shows a signal flowchart of the video bitstream ES and the PTS in the data transmission control system in the STB according to the present invention.

DETAILED DESCRIPTION OF THE PREFERRED EMBODIMENTS

The data transmission control system in the STB in accordance with an embodiment of the present invention will be in detail explained referring to the FIGUREs.

FIG. 4 shows a circuit block diagram about the data transmission control system of the STB in accordance with the embodiment according to the present invention.

Referring to FIG. 4, the STB establishes data transmission paths by using a demultiplexer DEMUX 10 for selecting a Presentation Time Stamps PTS and a video bitstream ES and an audio bitstream ES from compressed data, respectively, in which the compressed data are transmitted from a video server for dynamic image presentation, and a video decoder 30 and an audio decoder 40 for decoding the selected video/audio ESs according to the PTS respectively and applying the decoded ESs to a video output device and an audio output device.

And the data transmission control system comprises a microprocessor 20 for receiving the PTS selected from the DEMUX 10 and synchronizing the received PTS with a system clock and then applying the synchronized PTS to the transmission path in order to synchronize the dynamic image presentation signal on the data transmission path, with the system clock.

Additionally, the data transmission control system in the embodiment of the present invention comprises a video buffer 60-1 for storing the video ES temporarily and outputting the video ES in order to delay the video bitstream on the video ES transmission path through the DEMUX 10 and the video decoder 30 for a moment. Here, the video buffer 60-1 is indicated as one type of delay means about the video ES and it is possible to change the video buffer to other means which may output the video ES by delayed for a moment.

And the data transmission control system in the embodiment of the present invention comprises an audio buffer 60-2 for storing the audio ES temporarily and outputting the audio ES in order to delay the audio ES on the audio ES transmission path through the DEMUX 10 and the audio decoder 40 for a moment. Here, the audio buffer 60-2 is indicated as one type of delay means about the audio ES and it is possible to change the audio buffer to other means which may output the audio ES by delayed for a moment.

In addition, the data transmission control system in another embodiment of the present invention further comprises a control unit 50 for controlling a delay time of the video buffer 60-1 and the audio buffer 60-2 in accordance with supervising the PTS transmission time. The control unit 50 may be composed of a video unit and an audio unit, the video unit and the audio unit may be composed like FIG. 5 about the video ES and the audio ES, respectively and the operation may be carried out like FIG. 5b.

FIG. 5a indicates in detail a constitutional diagram of the control unit of the FIG. 4, and it is consisted of a buffer control unit 51 and an ES parsing unit 52.

FIG. 5 is an example of the video unit. It is composed of a buffer control unit 51 for controlling operations(such as empty, read, write) of the buffer 60-1 and the decoder 30 according to the PTS detecting flag(PTS-flag) from the microprocessor 20 and a picture start code detecting flag (START-flag) value from an ES parsing unit 52 and the ES parsing unit 52 for detecting a data starting point of the ES by received from the bitstream delay means, and outputting the ES to the decoder with setting the START-flag value.

FIG. 5b indicates in detail that the video unit of the control unit 50 operates about the video ES.

A first state S0 is transmitting data in the video buffer 60-1, to the video decoder 30 and goes into a second state S1 when received a signal PTS-flag=1 in which the signal tells that the PTS is detected by the microprocessor 20.

The second state S1 checks whether the data which is transmitted to the video decoder, is a picture start code or not. In case of the picture start code(START-flag=1), the second state S1 goes into a third state S2. During the picture start code is not detected(START-flag=0), the state S1 goes into the first state S0 in case that a signal(PTS-flag=0) is received from the microprocessor, in which the PTS-flag=0 tells that the PTS is completely transmitted to the video decoder 30.

The third state S2 is indicating that the picture start code exists(START-flag=1) before the PTS is not transmitted to the video decode. The state S2 stops the data transmission to the video decoder until the signal(PTS-flag=0) is transmitted to the control unit and goes into the first state S0 in case that the PTS transmission is completed(PTS-flag=0).

Here, the PTS-flag is operated by the microprocessor and says to the control unit that the audio/video PTS is found in the demultiplexer. In case of the PTS-flag=1, the PTS is found, and in case of the PTS-flag=0, the PTS is completely transmitted to the decoder.

And the START-flag is operated by the control unit 50. The START-flag is 1 if the video ES is a picture start point(picture_start_code(0x00000100)) and the audio ES is a frame start point(syncword(0xFFF)), and the START-flag is 0, otherwise. Here, the control unit 50 retrieves the ES for transmitting to the current decoder.

Accordingly, the control unit 50 controls the buffers 60-1, 2 in order to store the ES in the buffers 60-1, 2 temporarily by closing an output of the video buffer 60-1 and the audio buffer 60-2 when the PTS is applied from the DEMUX 10 to the microprocessor 20 and in order to be applied to the video decoder 30 and the audio decoder 40, respectively by opening the output of the buffers 60-1,2 when the PTS is applied from the microprocessor 20 to each decoder 30, 40.

It will be explained about the operation and effect of the present invention comprised with each step.

First, a demultiplexer DEMUX 10 demultiplexes a signal from a video server with use of a MPEG-2, transmits an audio ES signal to the audio decoder 40, and transmits a video ES to a video decoder 30. And the DEMUX 10 transmits a Presentation Time Stamps PTS which is the video synchronization signal, to the video decoder 30 in order to synchronize the video ES signal at the same time. Here, the PTS is applied to the video decoder 30 and the audio decoder 40 via the microprocessor in order to synchronize a presentation dynamic image with a system standard clock. And the transmission time of the PTS affects the synchronization of the video signal. Accordingly, when the PTS signal selected from the DEMUX 10 is applied to the microprocessor 20, the control unit 50 delays outputs of the video/audio ESs which will be applied to the video decoder 30 and the audio decoder 40 for a moment by controlling the buffers 60-1, 2 in order that the output end of the video buffers 60-1, 2 are closed. And then the control means 50 transmits the data ESs which stored in the buffers 60-1, 2 for a moment, to the video decoder 30 and the audio decoder 40 by controlling the buffers in order that the output end of the buffers 60-1, 2 open when the PTS signal is applied to the video decoder 30 and the audio decoder 40 from the microprocessor 20.

Accordingly, the video decoder 30 decodes the video data exactly such that the video ES signal and the PTS signal(or the audio ES and the PTS) are synchronized with the PTS1 and ES1, PTS2 and ES2, and PTS3 and ES3, respectively.

However, the ES signal outputted from the DEMUX 10 is continuously accumulated on the buffers 60-1, 2 when the transmission of the ES signal to the video decoder 30 or the audio decoder 40 is stopped. At this time, the transmission rate between the buffers 60-1, 2 and the decoders 30, 40 is variable for protecting the transmission delay by the ES accumulation. Additionally, the transmission delay is generated instantaneously. Consequently, the delay does not affect the video/audio synchronization because the transmission delay of the overall signal is not generated and the instant transmission delay is very short comparing with the frame rate of the video. And the decoders 30, 40 recognizes the PTS1 is the synchronization signal of the ES1, the PTS2 is the synchronization signal of the ES2 and PTS3 is the synchronization signal of the ES3 because the decoders 30, 40 allocate the PTS on the basis of the sequence header inside of the ES signal even though there are possibilities that a state like the FIG. 6 may be generated by the transmission delay of the ES signal applied to the decoders.

In other words, the decoders 30, 40 recognize that it is normal that the first PTS1 is the synchronization signal of the ES1. And then the decoders 30, 40 recognize the PTS2 is the synchronization signal of the ES2 because the decoders 30, 40 detect the sequence header of the ES2 even though the PTS2 from the microprocessor 20 is applied to the decoders 30, 40 before the transmission of the ES1 is completely transmitted by delay of the ES2 from the buffers 60-1, 60-2. So, the PTS2 and the ES2 are synchronized, successively.

In the prior art, there are problems, which the presentation screen is distorted or trembled and also lip sink is not matched with audio when the PTS and the video ES are asynchronized. To prevent above problems from happening, the present invention provides data transmission control system in the STB capable of matching output timings of a video or audio signal and a synchronous signal of the video or audio signal by controlling the transmission of the data bitstreams when transmission paths of video data or audio data and the synchronous signal of the video or audio data, are different from each other.

The present invention is not limited to the specifically disclosed embodiments, and variations and modifications may be made without departing from the scope of the present invention.

What is claimed is:

1. A data control system for decoding received data comprised of presentation time stamps and a sequence of video elementary streams, wherein each video elementary stream includes a picture start code, and wherein the presentation time stamps sequence the video elementary streams, the data control system comprising:
    a demultiplexer for separating the presentation time stamps and the sequence of video elementary streams;
    a data transmission control system for receiving the presentation time stamps from the demultiplexer and for producing therefrom corresponding system-time presentation time stamps, the data transmission control system further for producing presentation time stamp flags between reception of the presentation time stamps and the corresponding system-time presentation time stamps being fully produced;
    a video buffer for receiving the sequence of video elementary streams from the demultiplexer, the video buffer for outputting its received video elementary streams when a read command is received and for storing its received video elementary streams when a read command is not received;
    a decoder for decoding the sequence of video elementary streams into video data such that the picture start codes are synchronized with the system-time presentation time stamps; and
    a control unit for receiving the sequences of video elementary streams from the video buffer and for applying those video elementary streams to the decoder; the control unit includes a parsing unit for setting a start flag when the picture start code is found in one of the sequences of video elementary streams, the video buffer further including a buffer control unit for producing the read command when the start flag is set unless the presentation time stamp flag is set.

2. A data control system according to claim 1, wherein the data transmission control system includes a microprocessor.

3. A data control system according to claim 1, wherein the received data further comprises a sequence of audio elementary streams, and wherein the demultiplexer separates the presentation time stamps, the video elementary streams, and the audio elementary streams.

4. A data control system according to claim 3, wherein the received data is in accord with the Moving Picture Experts Group-2 (MPEG-2) format.

5. A data control system according to claim 3, further including an audio decoder for decoding the sequence of audio elementary streams into audio data.

6. A data control system according to claim 3, wherein the decoder also decodes the sequence of audio elementary streams into audio data.

7. A data control system according to claim 3 in the form of a Set Top Box.

8. A method of decoding received data comprised of presentation time stamps and a sequence of video elementary streams, wherein each video elementary stream includes a picture start code, and wherein the presentation time stamps time order the video elementary streams such that each presentation time stamp occurs before an associated picture start code, the method comprising:
    separating the presentation time stamps from the video data;
    producing from the separated presentation time stamps a corresponding system-time presentation time stamps, wherein the system-time presentation stamps are synchronized to a system's time; and
    selectively delaying the sequence of video elementary streams when one of the picture start codes occurs before its associated system-time presentation time stamp, to cause the picture start code to occur after its associated system-time presentation stamp.

9. A method of decoding received data according to claim 8, further including the step of decoding the sequence of video elementary streams into video data.

10. A method of decoding received data according to claim 9, wherein the received data further comprises a sequence of audio elementary streams, and wherein the step of separating the presentation time stamps from the video elementary streams also separates out the audio elementary streams.

11. A method of decoding received data according to claim 9, further including the step of decoding the sequence of audio elementary streams into audio data.

12. A method of decoding received data according to claim 8, wherein the step of selectively delaying the sequence of video elementary streams comprises the steps of:
    setting a presentation time stamp flag between an occurrence of one of the presentation time stamps and the corresponding system-time presentation time stamp;
    producing a start flag when the associated picture start code occurs; and
    storing the sequence of video elementary streams when a start flag is set while a presentation time stamp flag is also set.

13. A method of decoding received data according to claim 12, further including the step of decoding the sequence of video elementary streams into video data.

14. A method of decoding received data according to claim 13, wherein the received data further comprises a sequence of audio elementary streams, and wherein the step of separating the presentation time stamps from the video elementary streams also separates out the audio elementary streams.

15. A method of decoding received data according to claim 14, further including the step of decoding the sequence of audio elementary streams into audio data.

* * * * *